(No Model.)

G. W. BURCHARD.
SCALE FOR INDICATING THE BUTTER VALUE OF MILK AND CREAM.

No. 362,816. Patented May 10, 1887.

Witnesses
James F. DuHamel
R. S. Ferguson

G. W. Burchard
by Dodge & Son,
Attys

UNITED STATES PATENT OFFICE.

GEORGE W. BURCHARD, OF FORT ATKINSON, WISCONSIN.

SCALE FOR INDICATING THE BUTTER VALUE OF MILK AND CREAM.

SPECIFICATION forming part of Letters Patent No. 362,816, dated May 10, 1887.

Application filed December 23, 1886. Serial No. 222,358. (No model.)

*To all whom it may concern:*

Be it known that I, GEORGE W. BURCHARD, of Fort Atkinson, in the county of Jefferson and State of Wisconsin, have invented a new and useful Scale for Indicating the Butter Value of Milk and Cream and Method of Using the Same, of which the following is a specification.

My invention consists in a method of and device for ascertaining or determining the quantity of butter that a given quantity of cream will produce; and to that end it consists in a peculiarly-prepared scale to be used in combination with a test-tube or similar vessel, as hereinafter more fully described.

Figure 1:
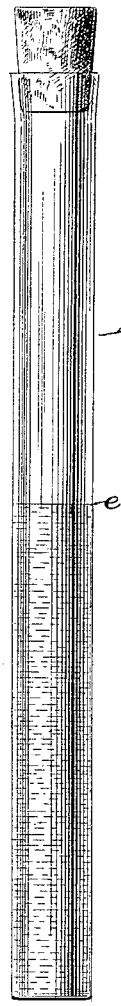
Figure 2:
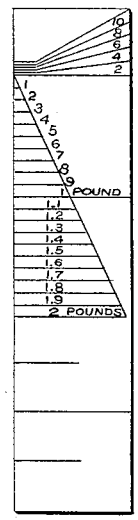
Figure 3:
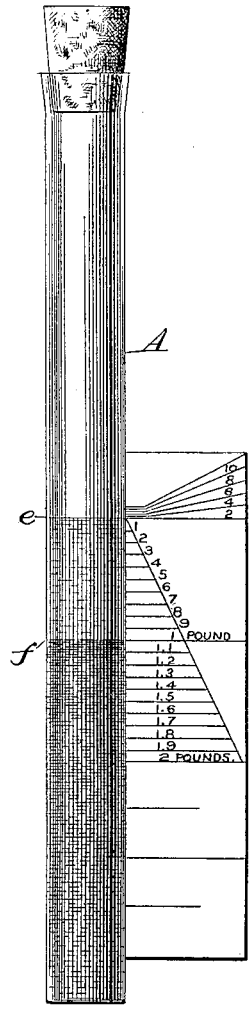

Figure 1 is a side elevation of the test-tube; Fig. 2, a face view of the scale; and Fig. 3 shows the manner of using the same.

The object of this invention is to provide a simple and cheap means of determining by measurement the weight of butter that a given quantity of cream will produce.

It is customary at the present time to manufacture butter in what are termed "creameries," the proprietors of which buy the cream from the farmers or owners of cows over a considerable tract of country, and who pay for the cream by the "creamery-inch," instead of by weight or liquid measurement, as will be hereinafter explained. As is well known, the cream or the milk from different cows varies in quality or richness, that from some cows containing a much greater proportion of butter or of butter-oil than that from others, and as the value, and consequently the price, varies in accordance with the variation in quality, it is desirable to have some simple yet reliable means of determining or ascertaining its quality, or, in other words, the amount or weight or butter contained in or that will be produced by a given quantity of milk or cream, whatever its quantity or grade may be, and thus to determine its butter-producing quality, and consequently its relative value.

The butter of commerce, or what is ordinarily known as "butter," is a compound containing butter-oil, water, and casine, of which butter-oil is the main ingredient. If, now, the quantity of butter-oil can be readily ascertained, the quality of the cream can at once be determined, provided we have a suitable scale by which to measure it. By experiment we find that butter-oil has a specific gravity of 91, (rejecting the slight fraction,) and constitutes about eighty-two per cent. (81.6676) in bulk of standard butter. It therefore follows that one pound of butter contains 24.86 cubic inches of butter-oil, because 81.6676 (the amount of butter-oil contained in a pound of butter) divided by 91, the specific gravity of the butter-oil, equals 89.74, which is the weight of an equal bulk of water, and this divided by .0361 (the weight of a cubic inch of water) equals 24.86 cubic inches. Having ascertained these facts, I then make my measuring-scale in accordance therewith; but in order to adapt the scale to general or popular use I graduate it to correspond with the vessels or utensils in general use.

To illustrate, the vessel or pail generally used for gathering cream from the farmers or dairymen, known as a "creamery-pail," is twelve inches in diameter, and therefore contains for every inch in depth 113+ cubic inches, while the test-tube A is usually filled with cream to the height of five inches for testing purposes. If the sample in the test-tube A produces, say, 1.1 inch of butter-oil, equal to twenty-two per cent. of the whole amount of cream in the tube, then what is termed a "creamery-inch"—that is, an inch in depth of cream in the creamery-pail or any vessel twelve inches in diameter—will, at the same rate, produce 24.86 cubic inches of butter-oil, which is the equivalent of a pound of butter. To measure the depth of butter-oil in the test-tube and give the result in pounds and fractions of a pound of butter, I therefore make a scale as shown in Fig. 2, and graduate it as there shown, in which the space designed to indicate one pound is made to occupy one and one-tenth inch, and so on for each additional pound, the scale shown being marked to indicate two pounds and ten hundredths of a pound of butter. The pound space of course may be divided into any fractional parts desired and the scale be graduated to indicate the same. If, for instance, it be divided into sixteen parts, the number of ounces in a pound, then, of course, the scale will indicate the quantity of butter in pounds and ounces; but, for convenience, I have divided the space into tenths, thus enabling the decimal system to be used, which is far more convenient in general practice.

The manner of using the scale is as follows: The test-tube A is filled with cream to be tested to the depth of five inches, as indicated in Fig. 1, there being usually a mark, e, on the tube at that height, so it can be filled to the proper height without trouble. The cream in the tube A is then churned by agitating or shaking the tube by hand or otherwise, though the usual practice at the creamery is to place a large number of these tubes, with the cream in them, tightly corked, into a test-churn and agitate them all at one operation. When the cream has been thus churned, so that the butter therein is separated from the milk, the tube is set in warm water, by which means the granules of butter are melted or converted into butter-oil, which rises to the top of the mass, as indicated in Fig. 2, the part between e and f indicating the butter-oil, while the portion below f indicates the buttermilk. This having been done, the scale B is then placed against the side of the tube, as represented in Fig. 2, and which shows that the butter-oil occupies a space equal to one and one-tenth of an inch, or the space on the scale marked "one pound," which indicates that one creamery-inch—that is to say, one inch in depth of cream in the creamery-pail, 12 inches in diameter, of the same quality as that in the test-tube—will produce one pound of butter, and so on for whatever space it may occupy on the scale, more or less. For the purpose of measuring small quantities the upper part of the scale is graduated in hundredths of a pound, the lines being spread apart at the opposite extremity to give room for the figures of a size to be easily read.

As the cream varies in quality—that is, as it produces more or less butter-oil—the quantity of butter that can be obtained varies, and the scale is graduated to show the relation between the butter-oil and the butter in any given sample of cream rather than the percentage of oil. Thus it will be seen that by the use of this scale and test-tube the quality of the cream or the amount of butter that a given quantity of cream furnished by each farmer or dairyman will produce can be readily determined, and the relative value of the cream be fixed to correspond. So, too, a dairyman having a number of cows can, by testing the cream or milk of each separately, ascertain the butter quality of each, thereby enabling him to improve his herd by discarding those yielding the smaller proportion of butter and replacing them with others of a superior quality.

If it be desired to test milk, the milk should be put into the test-tube and the tube be then set in cold water for twelve or more hours until the cream has risen, after which the tube should be removed from the water and allowed to stand, with the cream and milk therein, until the cream has "ripened" or become slightly acid, and which will require from twenty-four to forty-eight hours, depending somewhat upon the temperature. After the cream has ripened it is churned by shaking or agitating the tube and its contents, after which the butter produced is converted into butter-oil and measured by the scale in the same manner as hereinbefore set forth for testing cream. Where milk is tested instead of cream, there will of course be a much smaller quantity of butter-oil, and in that case that portion of the scale which is graduated to hundredths will be especially useful.

As hereinbefore stated, this scale is graduated to conform to the standard creamery pail or vessel, which is the unit of measurement in the purchase of cream.

If a different unit of measurement for the cream or milk is desired, or a longer or shorter column be used in the test-tube, the scale should be modified accordingly. For instance, if the column in the test-tube should be ten inches high, then the space on the scale now representing one pound would only represent one-half pound. In other words, the pound space on the scale must be of sufficient length to represent a percentage in the test-tube which, when applied to the quantity of cream represented by the unit of measurement, will produce 24.86 cubic inches. So, also, if for any reason it should be desired to increase or decrease the proportion of butter-oil in butter, (and which may be done,) the principles herein set forth afford all necessary data for modifying the scale to correspond therewith.

Having thus described my invention, what I claim is—

1. A scale, B, for measuring butter oil in test-tubes, graduated or marked to indicate in pounds or fractions of a pound the quantity of butter that a standard unit of cream or milk like the quality tested will produce.

2. A scale graduated or marked to correspond with the creamery-pail, or unit of measure for cream or milk, whereby said scale when used as described will indicate in pounds or fractions of a pound the quantity of butter that the cream or milk contained in the measuring unit will produce.

3. In combination with a test-tube, a scale, B, graduated or marked to indicate in pounds or fractions of a pound the quantity of butter that a standard unit of cream or milk of the same quality as that in the test-tube will produce.

GEO. W. BURCHARD.

Witnesses:
W. C. DODGE,
JAMES F. DU HAMEL.